United States Patent
Wang et al.

(10) Patent No.: US 12,413,755 B2
(45) Date of Patent: Sep. 9, 2025

(54) LUMA MAPPING WITH CHROMA SCALING FOR GRADUAL DECODING REFRESH

(71) Applicant: NOKIA TECHNOLOGIES OY, Espoo (FI)

(72) Inventors: Limin Wang, San Diego, CA (US); Krit Panusopone, San Diego, CA (US); Seungwook Hong, San Diego, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 25 days.

(21) Appl. No.: 17/907,230

(22) PCT Filed: Mar. 12, 2021

(86) PCT No.: PCT/EP2021/056326
§ 371 (c)(1),
(2) Date: Sep. 23, 2022

(87) PCT Pub. No.: WO2021/190956
PCT Pub. Date: Sep. 30, 2021

(65) Prior Publication Data
US 2023/0104384 A1    Apr. 6, 2023

Related U.S. Application Data

(60) Provisional application No. 63/000,119, filed on Mar. 26, 2020.

(51) Int. Cl.
*H04N 19/44* (2014.01)
*H04N 19/169* (2014.01)
(Continued)

(52) U.S. Cl.
CPC .......... *H04N 19/44* (2014.11); *H04N 19/172* (2014.11); *H04N 19/1883* (2014.11); *H04N 19/30* (2014.11)

(58) Field of Classification Search
None
See application file for complete search history.

(56) References Cited

U.S. PATENT DOCUMENTS

2024/0040154 A1* 2/2024 Laroche ............... H04N 19/174

OTHER PUBLICATIONS

Gommelet et al., "CE2: Gradual Decoding Refresh (GDR) Using Encoder and Normative Restrictions (Tests 2.1.a, 2.1.b and 2.1.c)", Joint Video Experts Team (JVET) of ITU-T SG 16 WP 3 and ISO/IEC JTC 1/SC 29/WG 11, Document JVET-P0193, (Oct. 1-11, 2019), 8 pages. (Year: 2019).*

(Continued)

*Primary Examiner* — Stuart D Bennett
(74) *Attorney, Agent, or Firm* — ALSTON & BIRD LLP

(57) ABSTRACT

A method, apparatus, and computer program product provide for management of luma mapping with chroma scaling (LMCS) processes for Gradual Decoding Refresh (GDR) pictures. In the context of a method, the method accesses a picture to be decoded and determines whether the picture is a GDR picture. The method can also prevent a LMCS decoding process from being applied to the GDR picture. Another method can determine whether a virtual boundary is within a current coding tree unit of the gradual decoding refresh picture and if so, prevent a chroma residual scaling decoding process associated with LMCS from being applied to one or more coding units within a clean area. Another method can pad a neighboring pixel area from one or more reconstructed pixels in a clean area for a chroma residual scaling decoding process associated with LMCS.

20 Claims, 12 Drawing Sheets

Picture header structure syntax

| picture_header_structure( ) { | Descriptor |
|---|---|
|   gdr_or_irap_pic_flag | u(1) |
|   if( gdr_or_irap_pic_flag ) | |
|     gdr_pic_flag | |
|   ... | |
|   if( sps_lmcs_enabled_flag ) { | |
|     ph_lmcs_enabled_flag | u(1) |
|     if( ph_lmcs_enabled_flag ) { | |
|       ph_lmcs_aps_id | u(2) |
|       if( ChromaArrayType != 0 && !gdr_pic_flag) | |
|         ph_chroma_residual_scale_flag | u(1) |
|     } | |
|   } | |
|   ... | |
| } | |

(51) Int. Cl.
*H04N 19/172* (2014.01)
*H04N 19/30* (2014.01)

(56) References Cited

OTHER PUBLICATIONS

Bross et al., "Versatile Video Coding (Draft 8)", Joint Video Experts Team (JVET) of ITU-T SG 16 WP 3 and ISO/IEC JTC 1/SC 29/WG 11, 17th Meeting, Document JVET-Q2001-v13, (Jan. 7-17, 2020), 508 pages.
Bross et al., "Versatile Video Coding (Draft 8)", Joint Video Experts Team (JVET) of ITU-T SG 16 WP 3 and ISO/IEC JTC 1/SC 29/WG 11, Document JVET-Q2001-vE, (Jan. 7-17, 2020), 510 pages.
Gommelet et al., "CE2: Gradual Decoding Refresh (GDR) Using Encoder and Normative Restrictions (Tests 2.1.a , 2.1.b and 2.1.c)", Joint Video Experts Team (JVET) of ITU-T SG 16 WP 3 and ISO/IEC JTC 1/SC 29/WG 11, Document JVET-P0193, (Oct. 1-11, 2019), 8 pages.
Gommelet et al., "Non-CE11: Non-CIP Normative Gradual Random Access", Joint Video Experts Team (JVET) of ITU-T SG 16 WP 3 and ISO/IEC JTC 1/SC 29/WG 11, Document JVET-O1048-v2, (Jul. 3-12, 2019), 4 pages.
International Search Report and Written Opinion for Patent Cooperation Treaty Application No. PCT/EP2021/056326 dated May 7, 2021, 16 pages.
Kazui et al., "CE2: Summary Report on Gradual Decoding Refresh", Joint Video Experts Team (JVET) of ITU-T SG 16 WP 3 and ISO/IEC JTC 1/SC 29/WG 11, Document JVET-P0022-v2, (Oct. 1-11, 2019), 7 pages.
Wang et al., "AHG9: Gradual Decoding Refresh for VVC", Joint Video Experts Team (JVET) of ITU-T SG 16 WP 3 and ISO/IEC JTC 1/SC 29/WG 11, Document JVET-Q0527, (Jan. 7-17, 2020), 6 pages.
Wang et al., "AHG9: On LMCS for GDR", Joint Video Experts Team (JVET) of ITU-T SG 16 WP 3 and ISO/IEC JTC 1/SC 29/WG 11, Document JVET-R0393, (Apr. 15-24, 2020), 6 pages.

* cited by examiner

Picture header structure syntax

| picture_header_structure( ) { | Descriptor |
|---|---|
|   gdr_or_irap_pic_flag | u(1) |
|   if( gdr_or_irap_pic_flag ) | |
|     gdr_pic_flag | |
|   ... | |
|   if( sps_lmcs_enabled_flag && !gdr_pic_flag ) { | |
|     ph_lmcs_enabled_flag | u(1) |
|     if( ph_lmcs_enabled_flag ) { | |
|       ph_lmcs_aps_id | u(2) |
|       if( ChromaArrayType != 0 ) | |
|         ph_chroma_residual_scale_flag | u(1) |
|     } | |
|   } | |
|   ... | |
| } | |

FIG. 4B

Picture header structure syntax

| | Descriptor |
|---|---|
| picture_header_structure( ) { | |
|   gdr_or_irap_pic_flag | u(1) |
|   if( gdr_or_irap_pic_flag ) | |
|     gdr_pic_flag | |
|   ... | |
|   if( sps_lmcs_enabled_flag) { | |
|     ph_lmcs_enabled_flag | u(1) |
|     if( ph_lmcs_enabled_flag ) { | |
|       ph_lmcs_aps_id | u(2) |
|       if( ChromaArrayType != 0 && !gdr_pic_flag) | |
|         ph_chroma_residual_scale_flag | u(1) |
|     } | |
|   } | |
|   ... | |
| } | |

FIG. 4C

– ( xCurry, yCurry ) = ( xCurr * SubWidthC, yCurr * SubHeightC ) and ( xCuCb, yCuCb ) is specified as top-left luma sample location of the coding unit that contains the luma sample at ( xCurry / sizeY * sizeY, yCurry / sizeY * sizeY ) and xVir is (VirtualBoundariesPosX[ 0 ] / sizeY * sizeY) and yVir is (VirtualBoundariesPosY[ 0 ] / sizeY * sizeY) and the following conditions are true.

– gdr_pic_flag is equal to 1,

– ph_chroma_residual_scale_flag is equal to 1,

– slice_lmcs_enabled_flag is equal to 1, and

– one of the two following conditions is true

▪ (NumVerVirtualBoundaries > 0 && xCuCb < VirtualBoundariesPosX[ 0 ]
    < xCuCb + sizeY && xVir <= xCurry < VirtualBoundariesPosX[ 0 ])

▪ (NumHorVirtualBoundaries > 0 && yCuCb < VirtualBoundariesPosY[ 0 ]
    < yCuCb + sizeY && yVir <= yCurry < VirtualBoundariesPosY[ 0 ]).

FIG. 5B

- The luma location ( xCuCb, yCuCb ) is specified as the top-left luma sample location of the coding unit that contains the luma sample at ( xCurr / sizeY * sizeY, yCurr / sizeY * sizeY ) and xVir is (VirtualBoundariesPosX[ 0 ] / sizeY * sizeY) and yVir is (VirtualBoundariesPosY[ 0 ] / sizeY * sizeY).

The variables availL and availT are derived as follows:

– The derivation process for neighbouring block availability as specified in clause 6.4.4 is invoked with the location ( xCurr, yCurr ) set equal to ( xCuCb, yCuCb ), the neighbouring luma location ( xNbY, yNbY ) set equal to ( xCuCb − 1, yCuCb ), checkPredMode set equal to FALSE, and cIdx set equal to 0 as inputs, and the output is assigned to availL.

– availL is set equal to FALSE if the following conditions are true

▪ gdr_pic_flag is equal to 1,

▪ ph_chroma_residual_scale_flag is equal to 1,

▪ slice_lmcs_enabled_flag is equal to 1,

▪ NumHorVirtualBoundaries > 0 && yCuCb < VirtualBoundariesPosY[ 0 ] < yCuCb + sizeY && yVir <= yCurrY < VirtualBoundariesPosY[ 0 ].

– The derivation process for neighbouring block availability as specified in clause 6.4.4 is invoked with the location ( xCurr, yCurr ) set equal to ( xCuCb, yCuCb ), the neighbouring luma location ( xNbY, yNbY ) set equal to ( xCuCb, yCuCb − 1 ), checkPredMode set equal to FALSE, and cIdx set equal to 0 as inputs, and the output is assigned to availT.

– availT is set equal to FALSE if the following conditions are true

▪ gdr_pic_flag is equal to 1,

▪ ph_chroma_residual_scale_flag is equal to 1,

▪ slice_lmcs_enabled_flag is equal to 1,

▪ NumVerVirtualBoundaries > 0 && xCuCb < VirtualBoundariesPosX[ 0 ] < xCuCb + sizeY && xVir <= xCurrY < VirtualBoundariesPosX[ 0 ].

FIG. 6B

– The luma location ( xCuCb, yCuCb ) is specified as the top-left luma sample location of the coding unit that contains the luma sample at ( xCurrY / sizeY * sizeY, yCurrY / sizeY * sizeY ) and xVir is (VirtualBoundariesPosX[ 0 ] / sizeY * sizeY) and yVir is (VirtualBoundariesPosY[ 0 ] / sizeY * sizeY).

– When availL is equal to TRUE,

– If gdr_pic_flag is equal to 1, ph_chroma_residual_scale_flag is equal to 1, slice_lmcs_enabled_flag is equal to 1 and (NumHorVirtualBoundaries > 0 && yCuCb < VirtualBoundariesPosY[ 0 ] < yCuCb + sizeY && yVir <= yCurrY < VirtualBoundariesPosY[ 0 ] ), the array recLuma[ cnt + i ] with i = 0..sizeY – 1 is set equal to
    currPic[ xCuCb – 1 ][ Min( yCuCb + i, VirtualBoundariesPosY[ 0 ] – 1) ] with i = 0..sizeY – 1, and cnt is set equal to ( cnt + sizeY ).

– Otherwise, the array recLuma[ i ] with i = 0..sizeY – 1 is set equal to
    currPic[ xCuCb – 1 ][ Min( yCuCb + i, pic_height_in_luma_samples – 1 ) ] with i = 0..sizeY – 1, and cnt is set equal to sizeY.

– When availT is equal to TRUE, the array recLuma is derived as follows:

– If gdr_pic_flag is equal to 1, ph_chroma_residual_scale_flag is equal to 1, slice_lmcs_enabled_flag is equal to 1 and (NumVerVirtualBoundaries > 0 && xCuCb < VirtualBoundariesPosX[ 0 ] < xCuCb + sizeY && xCuCb <= xCurrY < VirtualBoundariesPosX[ 0 ] ), the array recLuma[ cnt + i ] with i = 0..sizeY – 1 is set equal to
    currPic[ Min( xCuCb + i, VirtualBoundariesPosX[ 0 ] – 1 ) ][ yCuCb – 1 ] with i = 0..sizeY – 1, and cnt is set equal to ( cnt + sizeY ).

– Otherwise :

the array recLuma[ cnt + i ] with i = 0..sizeY – 1 is set equal to
    currPic[ Min( xCuCb + i, pic_width_in_luma_samples – 1 ) ][ yCuCb – 1 ] with i = 0..sizeY – 1, and cnt is set equal to ( cnt + sizeY ).

FIG. 7B

LUMA MAPPING WITH CHROMA SCALING FOR GRADUAL DECODING REFRESH

CROSS-REFERENCE TO RELATED APPLICATIONS

This application is a national phase entry of International Application No. PCT/EP2021/056326, filed Mar. 12, 2021, which claims benefit of U.S. Provisional Application No. 63/000,119, filed Mar. 26, 2020, the contents of which are hereby incorporated by reference in their entirety.

TECHNOLOGICAL FIELD

An example embodiment relates generally to techniques in video coding, and, more particularly, to techniques for efficient management of luma mapping with chroma scaling processes.

BACKGROUND

In video coding design, such as Advanced Video Coding (AVC), High Efficiency Video Coding (HEVC), and/or Versatile Video Coding (VVC), a coded video sequence may include intra coded pictures and inter coded pictures. Intra coded pictures may typically use more bits than inter coded pictures, such that the transmission time of intra coded pictures increases the encoder to decoder delay. For low delay applications, it may be desirable that all coded pictures use a similar number of bits such that the encoder to decoder delay can be reduced to around one picture interval. Hence, intra coded pictures mat not be ideal for (ultra) low delay applications. However, an intra coded picture may be needed at a random access point.

Approaches such as Gradual Decoding Refresh (GDR), Gradual Random Access (GRA), and Progressive Intra Refresh (PIR) may alleviate the delay issue with intra coded pictures. Instead of coding an intra picture at a random access point, GDR progressively refreshes pictures by spreading intra coded areas over several pictures. However, GDR may suffer incompatibility and/or other issues with certain coding tools, such as luma mapping with chroma scaling (LMCS), a process that is applied as part of the decoding process which maps luma samples to particular values and may apply a scaling operation to the values of chroma samples.

BRIEF SUMMARY

In an embodiment, an apparatus is provided comprising at least one processor and at least one memory including computer program code, the at least one memory and the computer program code configured to, with the at least one processor, cause the apparatus to access a picture to be decoded. The at least one memory and the computer program code are further configured to, with the at least one processor, cause the apparatus to determine whether the picture is a gradual decoding refresh picture. The at least one memory and the computer program code are further configured to, with the at least one processor, cause the apparatus to, in an instance in which the picture is a gradual decoding refresh picture, prevent a luma mapping with chroma scaling decoding process from being applied to the gradual decoding refresh picture.

In some embodiments of the apparatus, the luma mapping with chroma scaling decoding process comprises all decoding processes associated with luma mapping with chroma scaling. In some embodiments of the apparatus, the luma mapping with chroma scaling decoding process comprises only chroma residual scaling decoding processes associated with luma mapping with chroma scaling.

In another embodiment, an apparatus is provided comprising means for accessing a picture to be decoded. The apparatus further comprises means for determining whether the picture is a gradual decoding refresh picture. The apparatus further comprises means for, in an instance in which the picture is a gradual decoding refresh picture, preventing a luma mapping with chroma scaling decoding process from being applied to the gradual decoding refresh picture. In some embodiments, the luma mapping with chroma scaling decoding process comprises all decoding processes associated with luma mapping with chroma scaling. In some embodiments, the luma mapping with chroma scaling decoding process comprises only chroma residual scaling decoding processes associated with luma mapping with chroma scaling.

In another embodiment, a computer program product is provided comprising a non-transitory computer readable storage medium having program code portions stored thereon, the program code portions configured, upon execution, to access a picture to be decoded. The program code portions are further configured, upon execution, to determine whether the picture is a gradual decoding refresh picture. The program code portions are further configured, upon execution, to, in an instance in which the picture is a gradual decoding refresh picture, prevent a luma mapping with chroma scaling decoding process from being applied to the gradual decoding refresh picture.

In some embodiments of the computer program product, the luma mapping with chroma scaling decoding process comprises all decoding processes associated with luma mapping with chroma scaling. In some embodiments of the computer program product, the luma mapping with chroma scaling decoding process comprises only chroma residual scaling decoding processes associated with luma mapping with chroma scaling.

In another embodiment, a method is provided, the method comprising accessing a picture to be decoded. The method further comprises determining whether the picture is a gradual decoding refresh picture. The method further comprises, in an instance in which the picture is a gradual decoding refresh picture, preventing a luma mapping with chroma scaling decoding process from being applied to the gradual decoding refresh picture. In some embodiments of the method, the luma mapping with chroma scaling decoding process comprises all decoding processes associated with luma mapping with chroma scaling. In some embodiments of the method, the luma mapping with chroma scaling decoding process comprises only chroma residual scaling decoding processes associated with luma mapping with chroma scaling.

In another embodiment, an apparatus is provided comprising at least one processor and at least one memory including computer program code, the at least one memory and the computer program code configured to, with the at least one processor, cause the apparatus to access a gradual decoding refresh picture to be decoded. The at least one memory and the computer program code are further configured to, with the at least one processor, cause the apparatus to determine whether a virtual boundary is within a current coding tree unit of the gradual decoding refresh picture, the virtual boundary defining a separation of a clean area and a dirty area of the gradual decoding refresh picture. The at least one memory and the computer program code are further configured to, with the at least one processor, cause the apparatus to, in an instance in which the virtual boundary is within the current coding tree unit, prevent a chroma residual scaling decoding process associated with luma mapping with chroma scaling from being applied to one or more coding units within the clean area.

In another embodiment, an apparatus is provided comprising means for accessing a gradual decoding refresh picture to be decoded. The apparatus further comprises means for determining whether a virtual boundary is within a current coding tree unit of the gradual decoding refresh picture, the virtual boundary defining a separation of a clean area and a dirty area of the gradual decoding refresh picture. The apparatus further comprises means for, in an instance in which the virtual boundary is within the current coding tree unit, preventing a chroma residual scaling decoding process associated with luma mapping with chroma scaling from being applied to one or more coding units within the clean area.

In another embodiment, a computer program product is provided comprising a non-transitory computer readable storage medium having program code portions stored thereon, the program code portions configured, upon execution, to access a gradual decoding refresh picture to be decoded. The program code portions are further configured, upon execution, to determine whether a virtual boundary is within a current coding tree unit of the gradual decoding refresh picture, the virtual boundary defining a separation of a clean area and a dirty area of the gradual decoding refresh picture. The program code portions are further configured, upon execution, to, in an instance in which the virtual boundary is within the current coding tree unit, prevent a chroma residual scaling decoding process associated with luma mapping with chroma scaling from being applied to one or more coding units within the clean area.

In another embodiment, a method is provided, the method comprising accessing a gradual decoding refresh picture to be decoded. The method further comprises determining whether a virtual boundary is within a current coding tree unit of the gradual decoding refresh picture, the virtual boundary defining a separation of a clean area and a dirty area of the gradual decoding refresh picture. The method further comprises, in an instance in which the virtual boundary is within the current coding tree unit, preventing a chroma residual scaling decoding process associated with luma mapping with chroma scaling from being applied to one or more coding units within the clean area.

In another embodiment, an apparatus is provided comprising at least one processor and at least one memory including computer program code, the at least one memory and the computer program code configured to, with the at least one processor, cause the apparatus to access a current coding unit of a gradual decoding refresh picture to be decoded, the current coding unit being within a clean area. The at least one memory and the computer program code are further configured to, with the at least one processor, cause the apparatus to determine whether one or more pixels within a neighboring pixel area are within a dirty area. The at least one memory and the computer program code are further configured to, with the at least one processor, cause the apparatus to, in an instance in which one or more pixels within the neighboring pixel area are determined to be within the dirty area, prevent all pixels within the neighboring pixel area from being used for a chroma residual scaling process associated with luma mapping with chroma scaling.

In another embodiment, an apparatus is provided comprising means for accessing a current coding unit of a gradual decoding refresh picture to be decoded, the current coding unit being within a clean area. The apparatus further comprises means for determining whether one or more pixels within a neighboring pixel area are within a dirty area. The apparatus further comprises means for, in an instance in which one or more pixels within the neighboring pixel area are determined to be within the dirty area, preventing all pixels within the neighboring pixel area from being used for a chroma residual scaling process associated with luma mapping with chroma scaling.

In another embodiment, a computer program product is provided comprising a non-transitory computer readable storage medium having program code portions stored thereon, the program code portions configured, upon execution, to access a current coding unit of a gradual decoding refresh picture to be decoded, the current coding unit being within a clean area. The program code portions are further configured, upon execution, to determine whether one or more pixels within a neighboring pixel area are within a dirty area. The program code portions are further configured, upon execution, to, in an instance in which one or more pixels within the neighboring pixel area are determined to be within the dirty area, prevent all pixels within the neighboring pixel area from being used for a chroma residual scaling process associated with luma mapping with chroma scaling.

In another embodiment, a method is provided, the method comprising accessing a current coding unit of a gradual decoding refresh picture to be decoded, the current coding unit being within clean area. The method further comprises determining whether one or more pixels within a neighboring pixel area are within a dirty area. The method further comprises, in an instance in which one or more pixels within the neighboring pixel area are determined to be within the dirty area, preventing all pixels within the neighboring pixel area from being used for a chroma residual scaling process associated with luma mapping with chroma scaling.

In another embodiment, an apparatus is provided comprising at least one processor and at least one memory including computer program code, the at least one memory and the computer program code configured to, with the at least one processor, cause the apparatus to access a current coding unit of a gradual decoding refresh picture to be decoded, the current coding unit being within a clean area. The at least one memory and the computer program code are further configured to, with the at least one processor, cause the apparatus to determine whether one or more pixels within a neighboring pixel area are within a dirty area. The at least one memory and the computer program code are further configured to, with the at least one processor, cause the apparatus to, in an instance in which one or more pixels within the neighboring pixel area are determined to be within the dirty area, pad the neighboring pixel area from one or more reconstructed pixels in the clean area for a chroma scaling decoding process associated with luma mapping with chroma scaling.

In another embodiment, an apparatus is provided comprising means for accessing a current coding unit of a gradual decoding refresh picture to be decoded, the current coding unit being within a clean area. The apparatus further comprises means for determining whether one or more pixels within a neighboring pixel area are within a dirty area. The apparatus further comprises means for, in an instance in which one or more pixels within the neighboring pixel area are determined to be within the dirty area, padding the neighboring pixel area from one or more reconstructed pixels in the clean area for a chroma residual scaling decoding process associated with luma mapping with chroma scaling.

In another embodiment, a computer program product is provided comprising a non-transitory computer readable storage medium having program code portions stored thereon, the program code portions configured, upon execution, to access a current coding unit of a gradual decoding refresh picture to be decoded, the current coding unit being within a clean area. The program code portions are further configured, upon execution, to determine whether one or more pixels within a neighboring pixel area are within a dirty area. The program code portions are further configured, upon execution, to, in an instance in which one or more pixels within the neighboring pixel area are determined to be within the dirty area, pad the neighboring pixel area from one or more reconstructed pixels in the clean area for a chroma residual scaling decoding process associated with luma mapping with chroma scaling.

In another embodiment, a method is provided, the method comprising accessing a current coding unit of a gradual decoding refresh picture to be decoded, the current coding unit being within a clean area. The method further comprises determining whether one or more pixels within a neighboring pixel area are within a dirty area. The method further comprises, in an instance in which one or more pixels within the neighboring pixel area are determined to be within the dirty area, padding the neighboring pixel area from one or more reconstructed pixels in the clean area for a chroma residual scaling decoding process associated with luma mapping with chroma scaling.

BRIEF DESCRIPTION OF THE DRAWINGS

Figure 1:
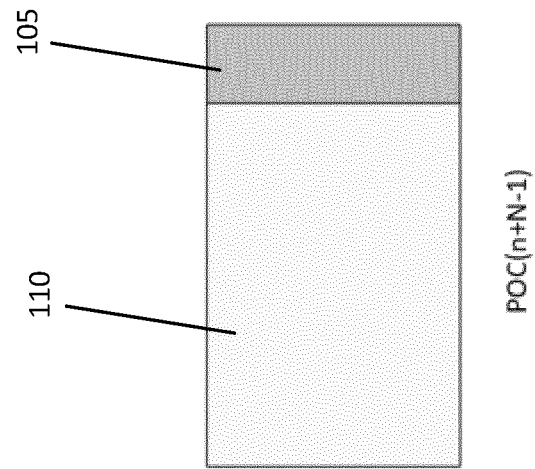
Figure 1:
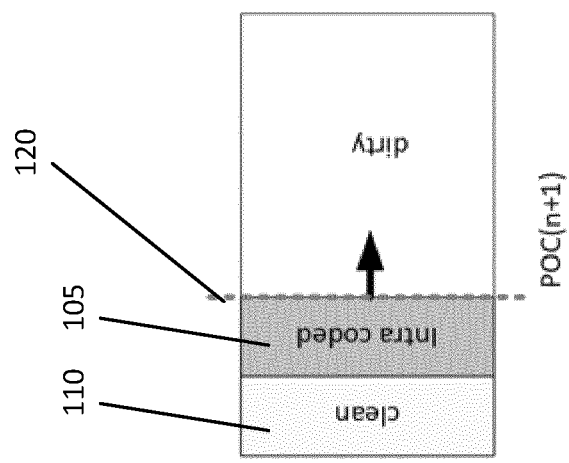
Figure 1:
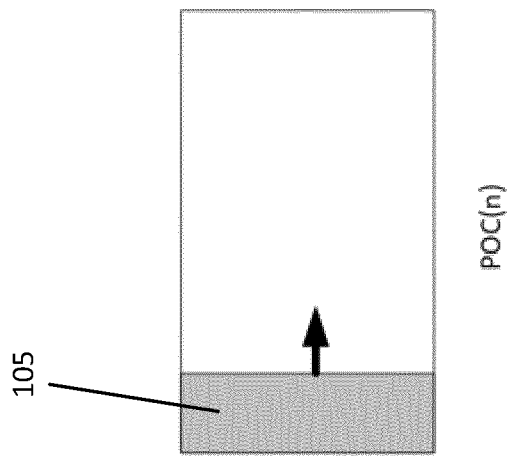
Figure 2:
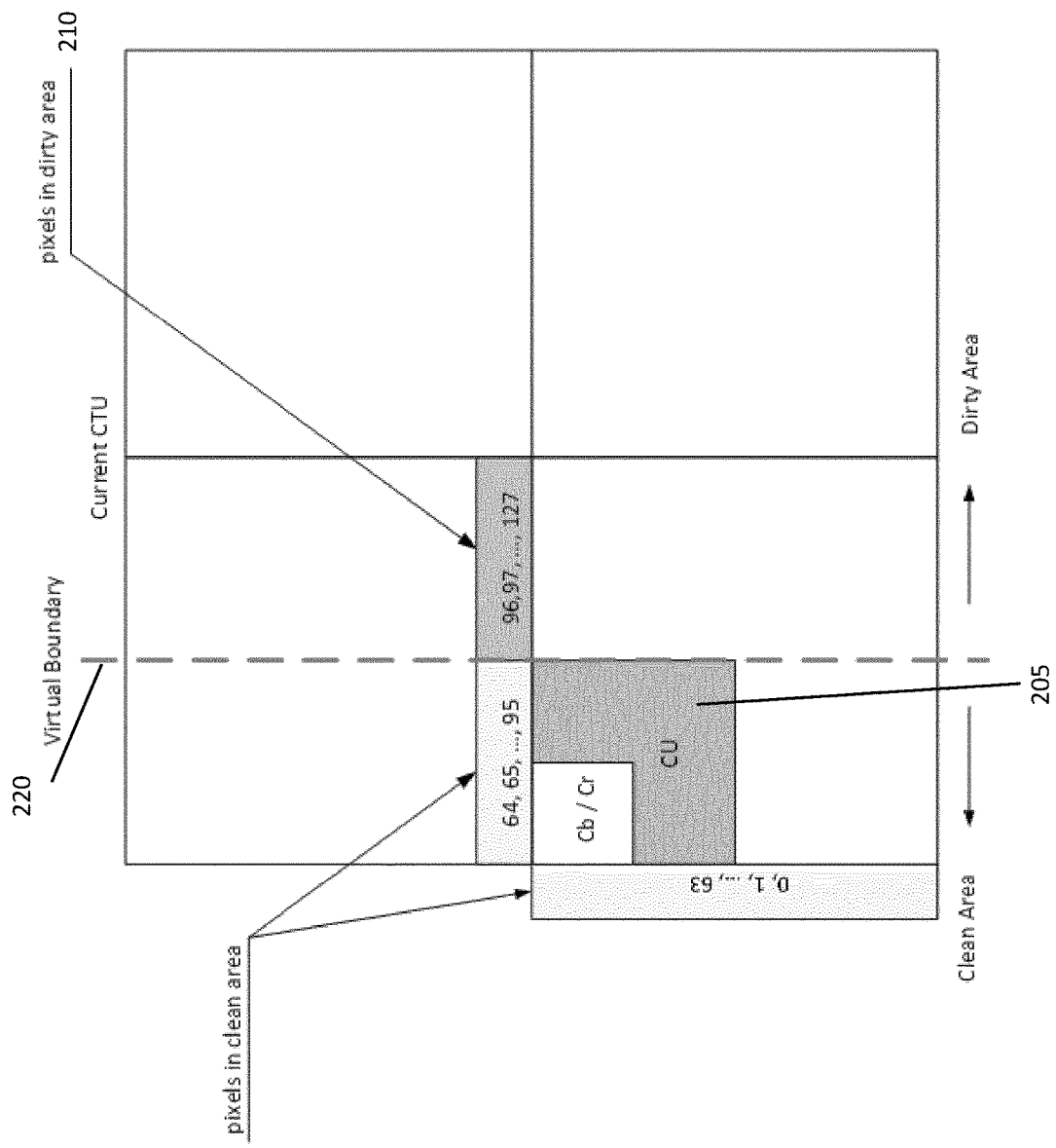
Figure 3:
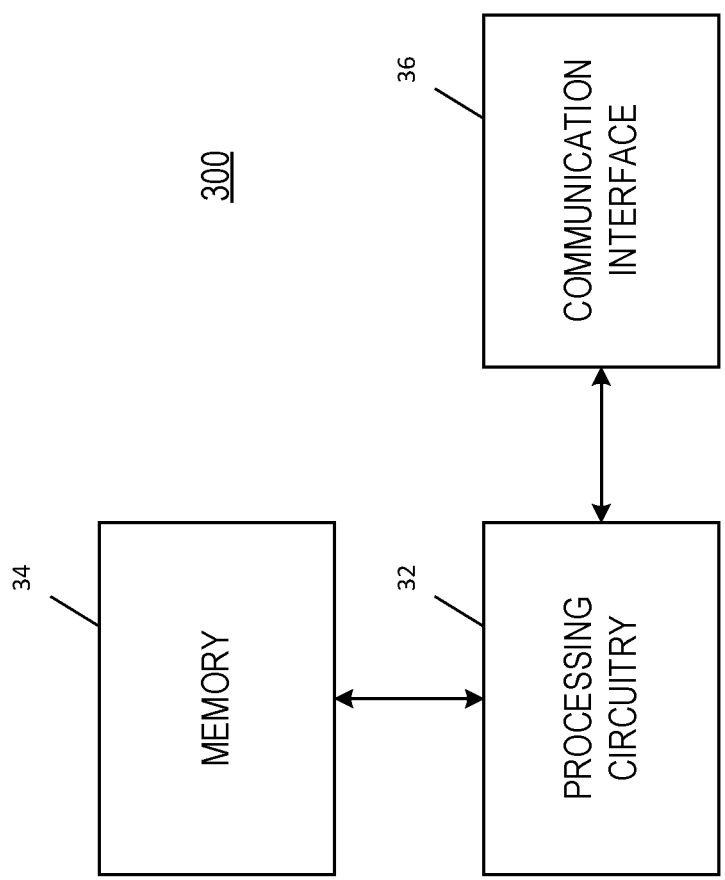
Figure 4A:
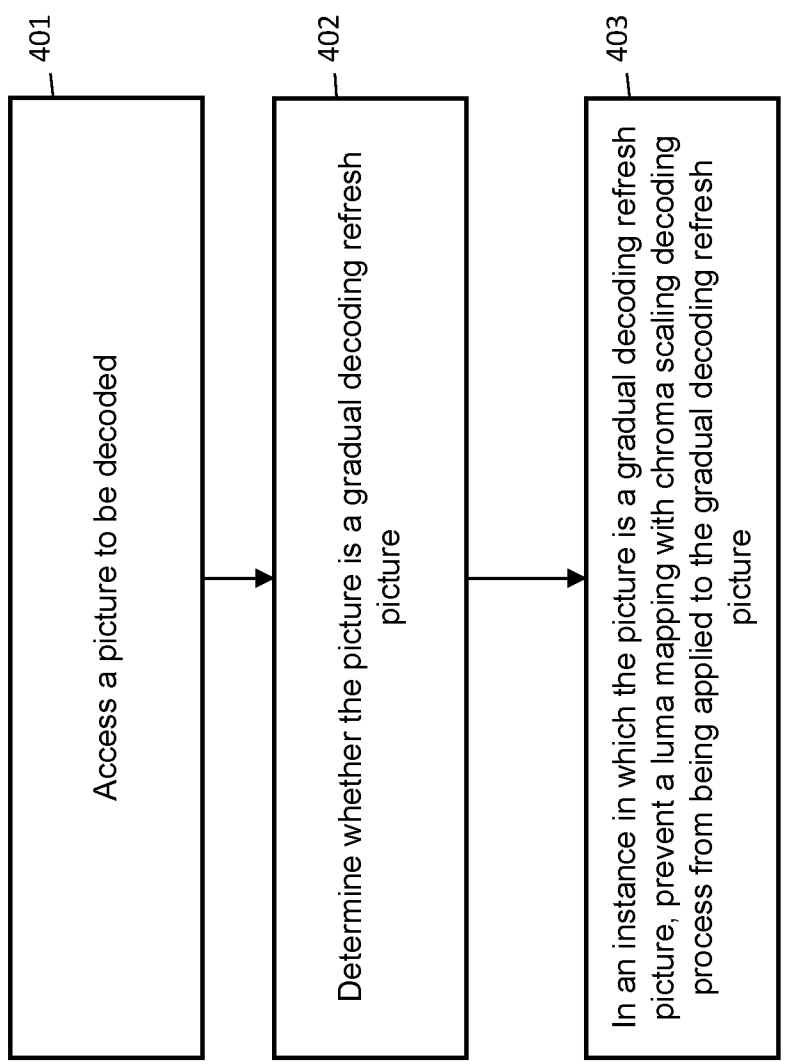
Figure 5A:
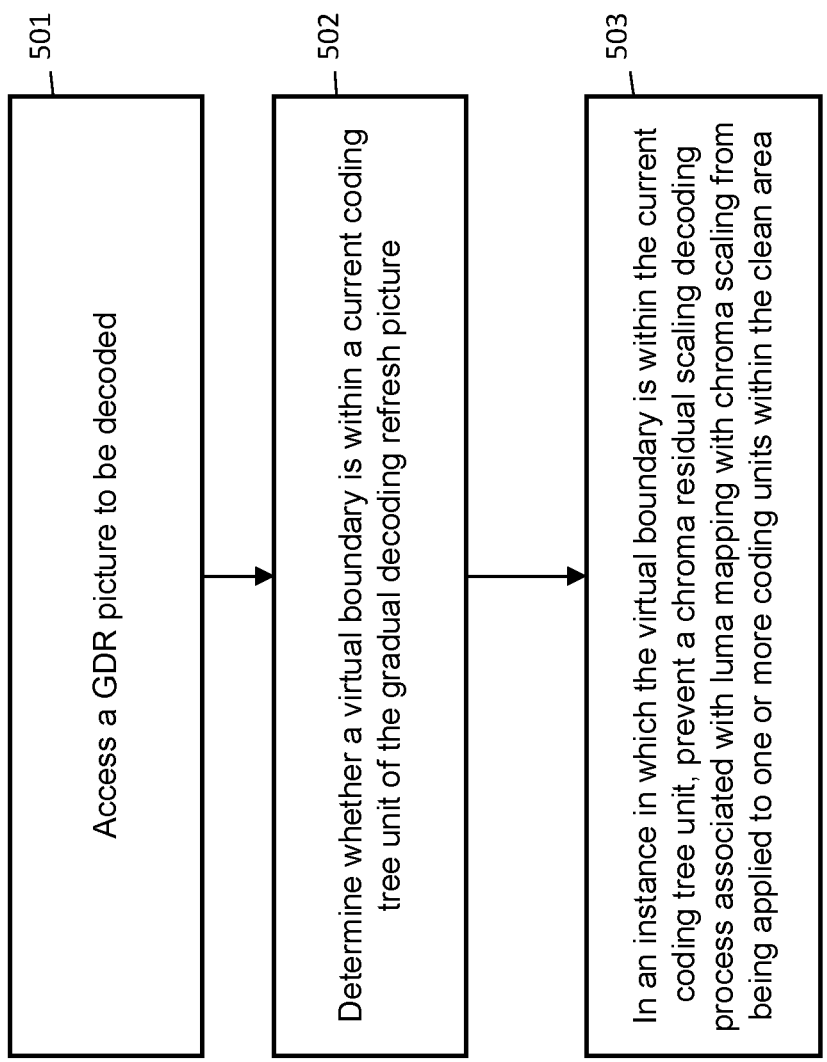
Figure 6A:
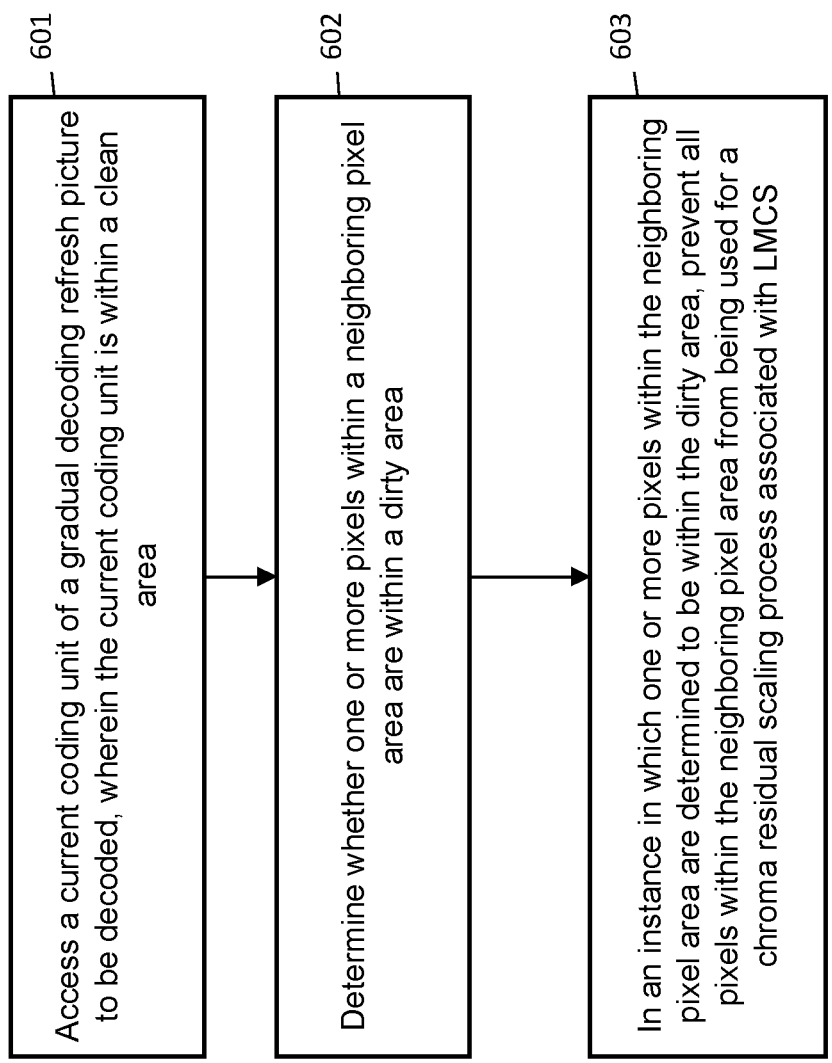
Figure 7A:
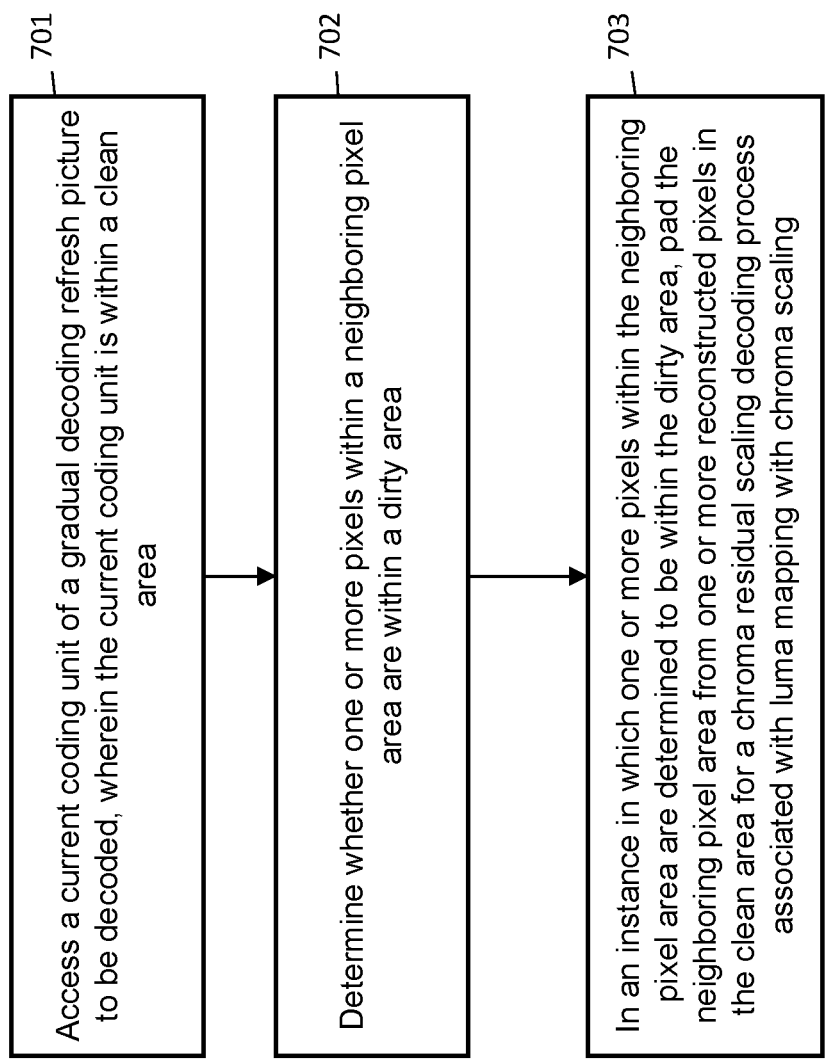

Having thus described certain example embodiments of the present disclosure in general terms, reference will hereinafter be made to the accompanying drawings, which are not necessarily drawn to scale, and wherein:

FIG. 1 is a representation of example GDR pictures wherein a clean area and a dirty area are separated by a virtual boundary in accordance with an example embodiment of the present disclosure;

FIG. 2 is a representation of an example coding tree unit in accordance with an example embodiment of the present disclosure;

FIG. 3 is a block diagram of an apparatus that may be specifically configured in accordance with an example embodiment of the present disclosure;

FIG. 4A is a flow diagram illustrating operations performed in accordance with an example embodiment;

FIG. 4B is a representation of an example usage of top and left neighboring blocks during combined inter intra prediction weight derivation;

FIG. 4C is a representation of an example usage of top and left neighboring blocks during combined inter intra prediction weight derivation;

FIG. 5A is a flow diagram illustrating operations performed in accordance with an example embodiment;

FIG. 5B is a representation of particular semantics changes for the VVC Specification in accordance with an example embodiment;

FIG. 6A is a flow diagram illustrating operations performed in accordance with an example embodiment;

FIG. 6B is a representation of particular semantics changes for the VVC Specification in accordance with an example embodiment;

FIG. 7A is a flow diagram illustrating operations performed in accordance with an example embodiment; and FIG. 7B is a representation of particular semantics changes for the VVC Specification in accordance with an example embodiment.

DETAILED DESCRIPTION

Some embodiments of the present disclosure will now be described more fully hereinafter with reference to the accompanying drawings, in which some, but not all, embodiments of the disclosure are shown. Indeed, some embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

Overview

As described above, the GDR approach may alleviate the delay issue with intra coded pictures. Instead of coding an intra picture at a random access point, GDR progressively refreshes pictures by spreading intra coded areas over several pictures. For example, a typical GDR picture consists of clean area (e.g., an area that has undergone an intra refresh) and dirty area (e.g., an area that has not yet undergone an intra refresh), wherein the clean area may contain a forced intra area next to dirty area for progressive intra refresh (PIR).

Versatile Video Coding (VVC) has adopted Picture Header, which includes virtual boundary syntax. With virtual boundary syntax included in Picture Header, a picture may have its own virtual boundaries. For example, a virtual boundary may be a horizontal or vertical line defining a boundary between a clean area and a dirty area.

FIG. 1 illustrates an example GDR with a vertical virtual boundary, where the forced intra coded area 105 moves left to right, and the clean area 110 expends gradually from the random access point of POC(n) to the recovery point of POC(N+n). A virtual boundary 120 separates the clean area 110 and the dirty area 115 of the GDR picture. In GDR, if an exact_match at the recovery point is required, coding units (CU) in a clean area cannot use any coding information (e.g., reconstructed pixels, code mode, motion vectors (MVs), reference index (refIdx), etc.) from the dirty area.

Included in VVC is a coding tool called luma mapping with chroma scaling (LMCS). LMCS is a process that is applied as part of the decoding process that maps luma samples to particular values and may apply a scaling operation to the values of chroma samples. Under the VVC Specification (B. Bross, J. Chen, S. Lin, and Y-K. Wang, "Versatile Video Coding", JVET-Q2001-v13, January 2020, which is incorporated by reference herein, and hereinafter referred to as the "VVC Specification"), LMCS for coding units in a clean area may use the pixels in dirty area. Thus, exact_match may not be able to be achieved for GDR with LMCS.

FIG. 2 shows an example of how LMCS for CUs in clean area may utilize the reconstructed pixels in dirty area, wherein coding tree unit (CTU) size is set to 128×128 pixels, and a virtual boundary passes through a current CTU and a current coding unit 205 of 32×32 within the current CTU is in a clean area.

In the VVC Specification, the syntax element sps_log2_ctu_size_minus5 is signaled, and the associated variables are calculated as follows:

$CtbSizeY=1<<(sps\_log 2\_ctu\_size\_minus5+5)$,
$sizeY=\text{Min}(CtbSizeY,64)$ For a current CU in a current CTU, an array, recLuma[i], i=0, 1, ..., 2*sizeY−1, is defined as a collection of sizeY left reconstructed neighboring pixels and sizeY above reconstructed neighboring pixels, as shown in FIG. 2 where sizeY=64.

The average of array recLuma[i], i=0, 1, ..., 2*sizeY−1, is calculated as:

$$invAvgLuma = \frac{\left(\sum_{0}^{2 \times sizeY-1} recLuma[i]\right) + sizeY}{2 \times sizeY}$$

The variable invAvgLuma calculated above is then used to determine a scaling factor, varScale, for chroma residuals:

$invAvgLuma \rightarrow varScale$

With the scaling factor varScale, the chroma components (Cb and Cr) of the current CU are then reconstructed as follows, wherein the subscript rec represented reconstructed, pre represents prediction, and res represents residual:

$Cb_{rec}[i][j]=Cb_{pre}[i][j]+Cb_{res}[i][j] \times varScale$ $Cr_{rec}[i][j]=Cr_{pre}[i][j]+Cr_{res}[i][j] \times varScale$ However, it may be possible that some elements of array recLuma[i], i=0, 1, ..., 2*sizeY−1, may be within a dirty area and thus the final reconstruction of chroma components of a current CU in a clean area may use the reconstructed neighboring luma pixels in the dirty area, which may cause leaks and result in exact match not being achievable. For example, as illustrated in FIG. 2, for the current CU 205, the above reconstructed neighboring luma pixels 210 are in a dirty area.

Example Apparatus

One example of an apparatus 300 that may be configured to carry out operations in accordance with an embodiment described herein is depicted in FIG. 3. As shown in FIG. 3, the apparatus includes, is associated with or is in communication with processing circuitry 32, a memory 34 and a communication interface 36. The processing circuitry 32 may be in communication with the memory via a bus for passing information among components of the apparatus. The memory may be non-transitory and may include, for example, one or more volatile and/or non-volatile memories. In other words, for example, the memory may be an electronic storage device (e.g., a computer readable storage medium) comprising gates configured to store data (e.g., bits) that may be retrievable by a machine (e.g., a computing device like the processing circuitry). The memory may be configured to store information, data, content, applications, instructions, or the like for enabling the apparatus to carry out various functions in accordance with an example embodiment of the present disclosure. For example, the memory could be configured to buffer input data for processing by the processing circuitry. Additionally, or alternatively, the memory could be configured to store instructions for execution by the processing circuitry.

The apparatus 100 may, in some embodiments, be embodied in various computing devices. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 32 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally, or alternatively, the processing circuitry may include one or more processors configured in tandem via the bus to enable independent execution of instructions, pipelining and/or multithreading.

In an example embodiment, the processing circuitry 32 may be configured to execute instructions stored in the memory device 34 or otherwise accessible to the processing circuitry. Alternatively, or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ one embodiment by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 36 may be any means such as a device or circuitry embodied in either hardware or a combination of hardware and software that is configured to receive and/or transmit data, including media content in the form of video or image files, one or more audio tracks or the like. In this regard, the communication interface may include, for example, an antenna (or multiple antennas) and supporting hardware and/or software for enabling communications with a wireless communication network. Additionally, or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

According to some embodiments, the apparatus 300 may be configured in accordance with an architecture for providing for video encoding, decoding, and/or compression. In this regard, the apparatus 300 may be configured as a video coding device. For example, the apparatus 300 may be configured to code video in accordance with one or more video compression standards, such as, for example, the VVC Specification. While certain embodiments herein refer to operations associated with the VVC standard, it is to be appreciated that the processes discussed herein may be utilized for any video coding standard.

Example Processes for LMCS for GDR

FIG. 4A shows a flowchart including operations of one embodiment in which a control is utilized for LMCS. At operation 401, the apparatus 300 includes means, such as the processing circuitry 32, memory 34, and/or the like, configured to access a picture to be decoded. For example, as described above, the picture may be included as part of a coded video sequence, and the apparatus 300 may be configured to access the picture during a coding process of the coded video sequence, such as during a decoding process.

At operation 402, the apparatus 300 includes means, such as the processing circuitry 32, memory 34, and/or the like, configured to determine whether the picture is a gradual decoding refresh (GDR) picture. In some embodiments, the determination as to whether the picture is a GDR picture may comprise analyzing a flag variable associated with the picture. As shown in FIG. 4B, an example Picture Header structure syntax includes a Boolean flag variable gdr_pic_flag. In this regard, if the picture is a GDR picture, none of LMCS related syntax elements will be signalled and the LMCS related decoding process will be skipped, which may save bits and processing cycles that would have otherwise been implemented. As seen in FIG. 4B, for GDR pictures comprising a gdr_pic_flag variable not equal to zero, the syntax flag ph_lmcs_enabled_flag is not signaled and it is inferred to be equal to zero.

Since the flag ph_lmcs_enabled_flag is equal to 0, the decoding process associated with LMCS will not be implemented for GDR pictures. In this regard, at operation 403, in an instance in which the picture is a GDR picture, the apparatus 300 includes means, such as the processing circuitry 32, memory 34, and/or the like, configured to prevent a luma mapping with chroma scaling decoding process from being applied to the GDR picture.

In another embodiment, the LMCS decoding process may be limited to the chroma components only. In this embodiment, if the current picture is a GDR picture, the syntax flag ph_chroma_residual_scale_flag will not be signalled and the chroma residual scaling associated with LMCS will be prevented from occurring. For example, FIG. 4C shows another example Picture Header structure syntax. As shown, for GDR pictures (e.g., when gdr_pic_flag is not equal to 0), the syntax flag ph_chroma_residual_scale_flag is not signaled and it is inferred to be equal to 0. Since the flag ph_chroma_residual_scale_flag is equal to 0, the decoding process associated with LMCS's chroma scaling will not be implemented for GDR pictures. In this regard, in some embodiments, the apparatus 300, such as the processing circuitry 32, memory 34, and/or the like, may be configured to prevent only chroma residual scaling decoding processes associated with LMCS from being applied to the gradual decoding refresh picture.

In another embodiment, for a current CU in a clean area of a current CTU with a virtual boundary passing through, if any of its sizeY above (or sizeY left) reconstructed neighboring pixels are in a dirty area, chroma residual scaling of LMCS may be prevented for the current CU within the clean area of the current CTU. Using FIG. 2 as an example, chroma residual scaling of LMCS for the current CU 205 is prevented since the virtual boundary 220 passes through the current CTU and the current CU 205 within the current CTU is in the clean area of the current CTU.

As shown in FIG. 5A, at operation 501, the apparatus 300 includes means, such as the processing circuitry 32, memory 34, and/or the like, configured to access a GDR picture to be decoded. As described above, the GDR picture may be included as part of a coded video sequence, and the apparatus 300 may be configured to access the GDR picture during a coding process of the coded video sequence, such as during a decoding process. At operation 502, the apparatus 300 includes means, such as the processing circuitry 32, memory 34, and/or the like, configured to determine whether a virtual boundary is within a current coding tree unit of the gradual decoding refresh picture. In some embodiments, the virtual boundary may define a separation of a clean area and a dirty area of the GDR picture. At operation 503, the apparatus 300 includes means, such as the processing circuitry 32, memory 34, and/or the like, configured to, in an instance in which the virtual boundary is within the current coding tree unit, prevent a chroma residual scaling decoding process associated with luma mapping with chroma scaling from being applied to one or more coding units within the clean area.

These operations may be performed through semantics changes and/or changes in the decoding process. Described below in Table A are changes for the section "picture reconstruction with luma dependent chroma residual scaling process for chroma samples" of the VVC Specification in accordance with certain embodiments described herein. FIG. 5B further highlights the specific changes to the section proposed herein.

TABLE A

Picture reconstruction with luma dependent chroma residual scaling process for chroma samples Inputs to this process are:
– a chroma location ( xCurr, yCurr ) of the top-left chroma sample of the current chroma transform block relative to the top-left chroma sample of the current picture,
– a variable nCurrSw specifying the chroma transform block width,
– a variable nCurrSh specifying the chroma transform block height,
– a variable tuCbfChroma specifying the coded block flag of the current chroma transform block,
– an (nCurrSw)x(nCurrSh) array predSamples specifying the chroma prediction samples of the current block,
– an (nCurrSw)x(nCurrSh) array resSamples specifying the chroma residual samples of the current block,
Output of this process is a reconstructed chroma picture sample array recSamples.
The variable sizeY is set equal to Min( CtbSizeY, 64 ).
The reconstructed chroma picture sample recSamples is derived as follows for
i = 0..nCurrSw − 1, j = 0..nCurrSh − 1:
– If one or more of the following conditions are true, recSamples[ xCurr + i ][ yCurr + j ] is set equal to Clip1( predSamples[ i ][ j ] + resSamples[ i ][ j ] ):
– ph_chroma_residual_scale_flag is equal to 0.
  – slice_lmcs_enabled_flag is equal to 0.
  – nCurrSw * nCurrSh is less than or euqal to 4.
  – tu_cbf_cb [ xCurr ][ yCurr ] is equal to 0 and tu_cbf_cr [ xCurr ][ yCurr ] is equal to 0.
  – ( xCurrY, yCurrY ) = ( xCurr * SubWidthC, yCurr * SubHeightC ) and ( xCuCb, yCuCb ) is specified as top-left luma sample location of the coding unit that contains the luma sample at ( xCurrY / sizeY * sizeY, yCurrY / sizeY * sizeY ) and xVir is (VirtualBoundariesPosX[ 0 ] / sizeY * sizeY) and yVir is (VirtualBoundariesPosY[ 0 ] / sizeY * sizeY) and the following conditions are true.
    – gdr_pic_flag is equal to 1,
    – ph_chroma_residual_scale_flag is equal to 1,
    – slice_lmcs_enabled_flag is equal to 1,
    – one of the two following conditions is true
      ■ (NumVerVirtualBoundaries > 0 && xCuCb < VirtualBoundariesPosX[ 0 ] < xCuCb + sizeY && xVir <= xCurrY < VirtualBoundariesPosX[ 0 ])
      ■ (NumHorVirtualBoundaries > 0 && yCuCb < VirtualBoundariesPosY[ 0 ] < yCuCb + sizeY && yVir <= yCurrY < VirtualBoundariesPosY[ 0 ] )
– Otherwise, the following applies:
  – The current luma location ( xCurrY, yCurrY ) is derived as follows:

( xCurrY, yCurrY ) = ( xCurr * SubWidthC, yCurr * SubHeightC )      (1234)

– The luma location ( xCuCb, yCuCb ) is specified as the top-left luma sample location of the coding unit that contains the luma sample at
  ( xCurrY / sizeY * sizeY, yCurrY / sizeY * sizeY ).
  – The variables availL and availT are derived as follows:
    – The derivation process for neighbouring block availability as specified in clause 6.4.4 is invoked with the location ( xCurr, yCurr ) set equal to ( xCuCb, yCuCb ), the neighbouring luma location ( xNbY, yNbY ) set equal to ( xCuCb − 1, yCuCb ), checkPredModeY set equal to FALSE, and cIdx set equal to 0 as inputs, and the output is assigned to availL.
    – The derivation process for neighbouring block availability as specified in clause 6.4.4 is invoked with the location ( xCurr, yCurr ) set equal to ( xCuCb, yCuCb ), the neighbouring luma location ( xNbY, yNbY ) set equal to ( xCuCb, yCuCb − 1 ), checkPredModeY set equal to FALSE, and cIdx set equal to 0 as inputs, and the output is assigned to availT.
  – The variable currPic specifies the array of reconstructed luma samples in the current picture.
  – For the derivation of the variable varScale the following ordered steps apply:
    1. The variable invAvgLuma is derived as follows:
      – The array recLuma[ i ] with i=0..( 2 * sizeY − 1 ) and the variable cnt are derived as follows:
        – The variable cnt is set equal to 0.
        – When availL is equal to TRUE, the array recLuma[ i ] with
        i = 0..sizeY − 1 is set equal to
        currPic[ xCuCb − 1 ][ Min( yCuCb + i, pic_height_in_luma_samples − 1 ) ] with i = 0..sizeY − 1, and cnt is set equal to sizeY.
        – When availT is equal to TRUE, the array recLuma[ cnt + i ] with i = 0..sizeY − 1 is set equal to
        currPic[ Min( xCuCb + i, pic_width_in_luma_samples − 1 ) ][ yCuCb − 1 ] with i = 0..sizeY − 1, and cnt is set equal to ( cnt + sizeY ).
      – The variable invAvgLuma is derived as follows:
        – If cnt is greater than 0, the following applies:
                                                                                          (1235)
          invAvgLuma = Clip1( ( $\Sigma_{k=0}^{cnt-1}$ recLuma[ k ] + ( cnt >> 1 ) ) >> Log2( cnt ) )
        – Otherwise (cnt is equal to 0), the following applies:
                                                                                          (1236)
          invAvgLuma = 1 << ( BitDepth − 1 )
    2. The variable idxYInv is derived by invoking the identification of piece-wise function index process for a luma sample as specified in clause 8.8.2.3 with the variable lumaSample set equal to invAvgLuma as the input and idxYInv as the TABLE A-continued Picture reconstruction with luma dependent chroma residual scaling process for chroma samples output.
   3. The variable varScale is derived as follows:

(1237)

varScale = ChromaScaleCoeff[ idxYInv ]
– The reconstructed chroma picture sample array recSamples is derived as follows:
  – If tuCbfChroma is equal to 1, the following applies:

(1238)

resSamples[ i ][ j ] =
      Clip3( –( 1 << BitDepth ), ( 1 << BitDepth ) – 1, resSamples[ i ][ j ] )

(1239)

recSamples[ xCurr + i ][ yCurr + j ] = Clip1( predSamples[ i ][ j ] +
      Sign( resSamples[ i ][ j ] ) * ( ( Abs( resSamples[ i ][ j ] ) * varScale +
      ( 1 << 10 ) ) >> 11 ) )
  – Otherwise (tuCbfChroma is equal to 0), the following applies:

(1240)

recSamples[ xCurr + i ][ yCurr + j ] = Clip1(predSamples[ i ][ j ] )

In another embodiment, for a current CU in a clean area of a current CTU with a virtual boundary passing through, if any of its sizeY above (or sizeY left) reconstructed neighboring pixels are in a dirty area, the entire row of sizeY above (or column of sizeY left) reconstructed neighboring pixels may be treated as unavailable for chroma residual scaling of LMCS for the current CU. For example, in FIG. 2, since the above reconstructed neighboring pixels 210 for the current CU 205 are in a dirty area, the entire row of 64 reconstructed neighboring pixels are treated as unavailable for chroma residual scaling of LMCS. In this regard, as shown in FIG. 6A, at operation 601, the apparatus 300 includes means, such as the processing circuitry 32, memory 34, and/or the like, configured to access a current coding unit of a gradual decoding refresh picture to be decoded, wherein the current coding unit is within a clean area. As described above, the GDR picture may be included as part of a coded video sequence. At operation 602, the apparatus 300 includes means, such as the processing circuitry 32, memory 34, and/or the like, configured to determine whether one or more pixels within a neighboring pixel area are within a dirty area. At operation 603, the apparatus 300 includes means, such as the processing circuitry 32, memory 34, and/or the like, configured to, in an instance in which one or more pixels within the top (or the left) neighboring pixel area are determined to be within the dirty area, prevent all of the pixels within the top (or the left) neighboring pixel area from being used for a chroma residual scaling decoding process associated with luma mapping with chroma scaling.

These operations may be performed through semantics changes and/or changes in the decoding process. Described below in Table B are changes for the section "picture reconstruction with luma dependent chroma residual scaling process for chroma samples" of the VVC specification in accordance with certain embodiments described herein. FIG. 6B further highlights the specific changes to the section proposed herein.

TABLE B

Picture reconstruction with luma dependent chroma residual scaling process for chroma samples Inputs to this process are:
– a chroma location ( xCurr, yCurr ) of the top-left chroma sample of the current chroma transform block relative to the top-left chroma sample of the current picture,
– a variable nCurrSw specifying the chroma transform block width,
– a variable nCurrSh specifying the chroma transform block height,
– a variable tuCbfChroma specifying the coded block flag of the current chroma transform block,
– an (nCurrSw)x(nCurrSh) array predSamples specifying the chroma prediction samples of the current block,
– an (nCurrSw)x(nCurrSh) array resSamples specifying the chroma residual samples of the current block,
Output of this process is a reconstructed chroma picture sample array recSamples.
The variable sizeY is set equal to Min( CtbSizeY, 64 ).
The reconstructed chroma picture sample recSamples is derived as follows for
i = 0..nCurrSw – 1, j = 0..nCurrSh – 1:
– If one or more of the following conditions are true, recSamples[ xCurr + i ][ yCurr + j ]
is set equal to Clip1( predSamples[ i ][ j ] + resSamples[ i ][ j ] ):
    – ph_chroma_residual_scale_flag is equal to 0.
    – slice_lmcs_enabled_flag is equal to 0.
    – nCurrSw * nCurrSh is less than or euqal to 4.
    – tu_cbf_cb [ xCurr ][ yCurr ] is equal to 0 and tu_cbf_cr [ xCurr ][ yCurr ] is equal to 0.
– Otherwise, the following applies:
  – The current luma location ( xCurrY, yCurrY ) is derived as follows:

(1234)

( xCurrY, yCurrY ) = ( xCurr * SubWidthC, yCurr * SubHeightC )
    – The luma location ( xCuCb, yCuCb ) is specified as the top-left luma sample
    location of the coding unit that contains the luma sample at
    ( xCurrY / sizeY * sizeY, yCurrY / sizeY * sizeY ) and xVir is
    (VirtualBoundariesPosX[ 0 ] / sizeY * sizeY) and yVir is TABLE B-continued Picture reconstruction with luma dependent chroma residual scaling process for chroma samples (VirtualBoundariesPosY[ 0 ] / sizeY * sizeY).
- The variables availL and availT are derived as follows:
  - The derivation process for neighbouring block availability as specified in
  clause 6.4.4 is invoked with the location ( xCurr, yCurr ) set equal to
  ( xCuCb, yCuCb ), the neighbouring luma location ( xNbY, yNbY ) set equal to
  ( xCuCb − 1, yCuCb ), checkPredModeY set equal to FALSE, and cIdx set equal
  to 0 as inputs, and the output is assigned to availL
  - availL is set equal to FALSE if the following conditions are true
    ■ gdr_pic_flag is equal to 1
    ■ ph_chroma_residual_scale_flag is equal to 1
    ■ slice_lmcs_enabled_flag is equal to 1
    ■ NumHorVirtualBoundaries > 0 && yCuCb < VirtualBoundariesPosY[ 0 ] <
    yCuCb + sizeY && yVir <= yCurrY < VirtualBoundariesPosY[ 0 ].
  - The derivation process for neighbouring block availability as specified in
  clause 6.4.4 is invoked with the location ( xCurr, yCurr ) set equal to
  ( xCuCb, yCuCb ), the neighbouring luma location ( xNbY, yNbY ) set equal to
  (xCuCb, yCuCb − 1 ), checkPredModeY set equal to FALSE, and cIdx set equal
  to 0 as inputs, and the output is assigned to availT.
  - availT is set equal to FALSE if the following conditions are true
    ■ gdr_pic_flag is equal to 1
    ■ ph_chroma_residual_scale_flag is equal to 1
    ■ slice_lmcs_enabled_flag is equal to 1
    ■ NumVerVirtualBoundaries > 0 && xCuCb < VirtualBoundariesPosX[ 0 ] <
    xCuCb + sizeY && xVir <= xCurrX < VirtualBoundariesPosX[ 0 ].
- The variable currPic specifies the array of reconstructed luma samples in the current
picture.
- For the derivation of the variable varScale the following ordered steps apply:
  4. The variable invAvgLuma is derived as follows:
    - The array recLuma[ i ] with i=0..( 2 * sizeY − 1 ) and the variable cnt are
    derived as follows:
      - The variable cnt is set equal to 0.
      - When availL is equal to TRUE, the array recLuma[ i ] with
      i = 0..sizeY − 1 is set equal to
      currPic[ xCuCb − 1 ][ Min( yCuCb + i, pic_height_in_luma_samples −
      1 ) ] with i = 0..sizeY − 1, and cnt is set equal to sizeY.
      - When availT is equal to TRUE, the array recLuma[ cnt + i ] with i =
      0..sizeY − 1 is set equal to
      currPic[ Min( xCuCb + i, pic_width_in_luma_samples − 1 ) ][ yCuCb −
      1 ] with i = 0..sizeY − 1, and cnt is set equal to ( cnt + sizeY ).
    - The variable invAvgLuma is derived as follows:
      - If cnt is greater than 0, the following applies:

invAvgLuma = Clip1( ( $\Sigma_{k=0}^{cnt-1}$ recLuma[ k ] + ( cnt >> 1 ) ) >>
      Log2( cnt ) )                                                                    (1235)

- Otherwise (cnt is equal to 0), the following applies:

invAvgLuma = 1 << ( BitDepth − 1 )                                               (1236)

5. The variable idxYInv is derived by invoking the identification of piece-wise
  function index process for a luma sample as specified in clause 8.8.2.3 with the
  variable lumaSample set equal to invAvgLuma as the input and idxYInv as the
  output.
  6. The variable varScale is derived as follows:

varScale = ChromaScaleCoeff[ idxYInv ]                                             (1237)

- The reconstructed chroma picture sample array recSamples is derived as follows:
  - If tuCbfChroma is equal to 1, the following applies:
                                                                                       (1238)
  resSamples[ i ][ j ] =
  Clip3( −( 1 << BitDepth ), ( 1 << BitDepth ) − 1, resSamples[ i ][ j ] )
                                                                                       (1239)
  recSamples[ xCurr + i ][ yCurr + j ] = Clip1( predSamples[ i ][ j ] +
  Sign( resSamples[ i ][ j ] ) * ( ( Abs( resSamples[ i ][ j ] ) * varScale +
  ( 1 << 10 ) ) >> 11 ) )
  - Otherwise (tuCbfChroma is equal to 0), the following applies:
                                                                                       (1240)
  recSamples[ xCurr + i ][ yCurr + j ] = Clip1(predSamples[ i ][ j ] )

In another embodiment, for a CU in a clean area of a current CTU with a virtual boundary passing through, if one or more of its sizeY above (or sizeY left) reconstructed neighbouring pixels are in a dirty area, the reconstructed neighboring pixels in the dirty area may be padded from the reconstructed pixels in the clean area for chroma residual scaling of LMCS for the current CU. For example, in FIG. 2, since the above reconstructed neighboring pixels 210 for the current CU 205 are in a dirty area, they are padded from the reconstructed pixel 95. In this regard, as shown in FIG. 7A, at operation 701, the apparatus 300 includes means, such as the processing circuitry 32, memory 34, and/or the like, configured to access a current coding unit of a gradual decoding refresh picture to be decoded, wherein the current coding unit is within a clean area. As described above, the GDR picture may be included as part of a coded video sequence. At operation 702, the apparatus 300 includes means, such as the processing circuitry 32, memory 34, and/or the like, configured to determine whether one or more pixels within a neighboring pixel area are within a dirty area. At operation 703, the apparatus 300 includes means, such as the processing circuitry 32, memory 34, and/or the like, is configured to, in an instance in which one or more pixels within the neighboring pixel area are determined to be within the dirty area, pad the neighboring pixels in the dirty area from one or more reconstructed pixels in the clean area for a chroma residual scaling decoding process associated with luma mapping with chroma scaling.

These operations may be performed through semantics changes and/or changes in the decoding process. Table C describes changes for the section "picture reconstruction with luma dependent chroma residual scaling process for chroma samples" of the VVC specification in accordance with certain embodiments described herein. FIG. 7B further highlights the specific changes to the section proposed herein.

TABLE C

Picture reconstruction with luma dependent chroma residual scaling process for chroma samples Inputs to this process are:
– a chroma location ( xCurr, yCurr ) of the top-left chroma sample of the current chroma transform block relative to the top-left chroma sample of the current picture,
– a variable nCurrSw specifying the chroma transform block width,
– a variable nCurrSh specifying the chroma transform block height,
– a variable tuCbfChroma specifying the coded block flag of the current chroma transform block,
– an (nCurrSw)x(nCurrSh) array predSamples specifying the chroma prediction samples of the current block,
– an (nCurrSw)x(nCurrSh) array resSamples specifying the chroma residual samples of the current block,
Output of this process is a reconstructed chroma picture sample array recSamples.
The variable sizeY is set equal to Min( CtbSizeY, 64 ).
The reconstructed chroma picture sample recSamples is derived as follows for
i = 0..nCurrSw − 1, j = 0..nCurrSh − 1:
– If one or more of the following conditions are true, recSamples[ xCurr + i ][ yCurr + j ]
is set equal to Clip1( predSamples[ i ][ j ] + resSamples[ i ][ j ] ):
  – ph_chroma_residual_scale_flag is equal to 0.
  – slice_lmcs_enabled_flag is equal to 0.
  – nCurrSw * nCurrSh is less than or euqal to 4.
  – tu_cbf_cb [ xCurr ][ yCurr ] is equal to 0 and tu_cbf_cr [ xCurr ][ yCurr ] is equal to 0.
– Otherwise, the following applies:
  – The current luma location ( xCurrY, yCurrY ) is derived as follows:

( xCurrY, yCurrY ) = ( xCurr * SubWidthC, yCurr * SubHeightC )     (1234)

– The luma location ( xCuCb, yCuCb ) is specified as the top-left luma sample location
  of the coding unit that contains the luma sample at
  ( xCurrY / sizeY * sizeY, yCurrY / sizeY * sizeY ) and xVir is
  (VirtualBoundariesPosX[ 0 ] / sizeY * sizeY) and yVir is
  (VirtualBoundariesPosY[ 0 ] / sizeY * sizeY).
  – The variables availL and availT are derived as follows:
    – The derivation process for neighbouring block availability as specified in
    clause 6.4.4 is invoked with the location ( xCurr, yCurr ) set equal to
    ( xCuCb, yCuCb ), the neighbouring luma location ( xNbY, yNbY ) set equal to
    ( xCuCb − 1, yCuCb ), checkPredModeY set equal to FALSE, and cIdx set equal
    to 0 as inputs, and the output is assigned to availL.
    – The derivation process for neighbouring block availability as specified in
    clause 6.4.4 is invoked with the location ( xCurr, yCurr ) set equal to
    ( xCuCb, yCuCb ), the neighbouring luma location ( xNbY, yNbY ) set equal to
    ( xCuCb, yCuCb − 1 ), checkPredModeY set equal to FALSE, and cIdx set equal
    to 0 as inputs, and the output is assigned to availT.
– The variable currPic specifies the array of reconstructed luma samples in the current picture.
– For the derivation of the variable varScale the following ordered steps apply:
  7. The variable invAvgLuma is derived as follows:
    – The array recLuma[ i ] with i=0..( 2 * sizeY − 1 ) and the variable cnt are
    derived as follows:
      – The variable cnt is set equal to 0.
      – When availL is equal to TRUE,
        – If gdr_pic_flag is equal to 1, ph_chroma_residual_scale_flag is equal
        to 1, slice_lmcs_enabled_flag is equal to 1 and
        (NumHorVirtualBoundaries > 0 && yCuCb <
        VirtualBoundariesPosY[ 0 ] < yCuCb + sizeY && yVir <= yCurrY <
        VirtualBoundariesPosY[ 0 ]),
          – the array recLuma[ cnt + i ] with i = 0..sizeY − 1 is set equal to
          currPic[ xCuCb − 1 ][ Min( yCuCb + i, VirtualBoundariesPosY
          [ 0 ] - 1) ] with i = 0..sizeY − 1, and cnt is set equal to
          ( cnt + sizeY ).
        – Otherwise,
          the array recLuma[ i ] with i = 0..sizeY − 1 is set equal to
          currPic[ xCuCb − 1 ][ Min( yCuCb + i, pic_height_in_luma_samples − 1 ) ]
          with i = 0..sizeY − 1, and cnt is set equal to sizeY.
      – When availT is equal to TRUE, the array recLuma is derived as
      follows:

TABLE C-continued

Picture reconstruction with luma dependent chroma residual scaling process for chroma samples

- If gdr_pic_flag is equal to 1, ph_chroma_residual_scale_flag is equal
  to 1, slice_lmcs_enabled_flag is equal to 1 and
  (NumVerVirtualBoundaries > 0 && xCuCb <
  VirtualBoundariesPosX[ 0 ] < xCuCb + sizeY && xCuCb <= xCurrY <
  VirtualBoundariesPosX[ 0 ]),
    the array recLuma[ cnt + i ] with i = 0..sizeY − 1 is set equal to
    currPic[ Min( xCuCb + i, VirtualBoundariesPosX[ 0 ]   1 ) ]
    [ yCuCb − 1 ] with i = 0..sizeY − 1, and cnt is set equal to
    ( cnt + sizeY ).
- Otherwise :
    the array recLuma[ cnt + i ] with i = 0..sizeY − 1 is set equal to
    currPic[ Min( xCuCb + i, pic_width_in_luma_samples − 1 ) ][ yCuCb − 1 ]
    with i = 0..sizeY − 1, and cnt is set equal to ( cnt + sizeY ).
- The variable invAvgLuma is derived as follows:
  - If cnt is greater than 0, the following applies:                                                                                 (1235)

invAvgLuma = Clip1( ( $\Sigma_{k=0}^{cnt-1}$ recLuma[ k ] + ( cnt >> 1 ) ) >>
    Log2( cnt ) )
  - Otherwise (cnt is equal to 0), the following applies:                                                                           (1236)

invAvgLuma = 1 << ( BitDepth − 1 )
8. The variable idxYInv is derived by invoking the identification of piece-wise
function index process for a luma sample as specified in clause 8.8.2.3 with the
variable lumaSample set equal to invAvgLuma as the input and idxYInv as the
output.
9. The variable varScale is derived as follows:                                                                                     (1237)

varScale = ChromaScaleCoeff[ idxYInv ]
- The reconstructed chroma picture sample array recSamples is derived as follows:
  - If tuCbfChroma is equal to 1, the following applies:                                                                            (1238)

resSamples[ i ][ j ] =
    Clip3( −( 1 << BitDepth ), ( 1 << BitDepth ) − 1, resSamples[ i ][ j ] )                                                         (1239)

recSamples[ xCurr + i ][ yCurr + j ] = Clip1( predSamples[ i ][ j ] +
    Sign( resSamples[ i ][ j ] ) * ( ( Abs( resSamples[ i ][ j ] ) * varScale +
    ( 1 << 10 ) ) >> 11 ) )
  - Otherwise (tuCbfChroma is equal to 0), the following applies:                                                                   (1240)

recSamples[ xCurr + i ][ yCurr + j ] = Clip1(predSamples[ i ][ j ] )

As described above, a method, apparatus, and computer program product are disclosed for facilitating LMCS processes in accordance with GDR pictures and providing solutions to compatibility issues with LMCS and GDR. Benefits of this design include reduced transmission time of pictures and decreased encoder to decoder delay.

FIGS. 4A, 5A, 6A, and 7A illustrate flowcharts depicting methods according to a certain example embodiments. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 34 of an apparatus employing an embodiment of the present disclosure and executed by a processor 32. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising: at least one processor; and at least one memory including computer program code, the at least one memory and the computer program code configured to, with the at least one processor, cause the apparatus to:
   access a picture to be decoded, wherein the picture is part of a plurality of pictures of a coded video sequence;
   determine whether the picture is a gradual decoding refresh picture; and
   in an instance in which the picture is the gradual decoding refresh picture and on a per picture basis:
      prevent a luma mapping with chroma scaling decoding process from being applied to only the picture while permitting the luma mapping with chroma scaling decoding process to be applied to one or more other pictures of the plurality of pictures.

2. The apparatus of claim 1, wherein the luma mapping with chroma scaling decoding process comprises all decoding processes associated with luma mapping with chroma scaling.

3. The apparatus of claim 1, wherein the luma mapping with chroma scaling decoding process comprises only chroma residual scaling decoding processes associated with luma mapping with chroma scaling.

4. The apparatus of claim 1, wherein the apparatus is further caused to:
   in an instance in which the picture is the gradual decoding refresh picture:
   determine whether a virtual boundary is within a current coding tree unit of the gradual decoding refresh picture, wherein the virtual boundary defines a separation of a clean area and a dirty area of the gradual decoding refresh picture; and
   in an instance in which the virtual boundary is within the current coding tree unit:
   prevent a chroma residual scaling decoding process associated with luma mapping with chroma scaling from being applied to one or more coding units within the clean area.

5. The apparatus of claim 4, wherein the apparatus is further caused to:
   responsive to a current coding unit, within the clean area, of the current coding tree comprising one or more neighboring pixels, within the dirty area, prevent the chroma residual scaling decoding process associated with luma mapping with chroma scaling from being applied to a row associated with the current coding unit and the one or more neighboring pixels.

6. The apparatus of claim 1, wherein the gradual refresh decoding picture comprises a current coding unit, and wherein the apparatus is further caused to:
   access the current coding unit of a gradual decoding refresh picture to be decoded, wherein the current coding unit is within a clean area;
   determine whether one or more pixels within a neighboring pixel area are within a dirty area; and
   in an instance in which one or more pixels within the neighboring pixel area are determined to be within the dirty area:
   prevent all pixels within the neighboring pixel area from being used for a chroma residual scaling process associated with luma mapping with chroma scaling.

7. The apparatus of claim 1, wherein the gradual decoding refresh picture comprises a current coding unit, and wherein the apparatus is further caused to:
   access the current coding unit of a gradual decoding refresh picture to be decoded, wherein the current coding unit is within a clean area;
   determine whether one or more pixels within a neighboring pixel area are within a dirty area; and
   in an instance in which one or more pixels within the neighboring pixel area are determined to be within the dirty area:
   pad the neighboring pixel area from one or more reconstructed pixels in the clean area for a chroma scaling decoding process associated with luma mapping with chroma scaling.

8. The apparatus of claim 1, wherein determining whether the picture is the gradual decoding refresh picture further comprises analyzing a flag variable associated with the picture.

9. The apparatus of claim 1, wherein preventing the luma mapping with chroma scaling decoding process from being applied to the picture decreases an encoder to decoder delay.

10. A computer program product comprising a non-transitory computer readable storage medium having program code portions stored thereon, the program code portions configured, upon execution, to:
   access a picture to be decoded, wherein the picture is part of a plurality of pictures of a coded video sequence;
   determine whether the picture is a gradual decoding refresh picture; and
   in an instance in which the picture is the gradual decoding refresh picture and on a per picture basis:
      prevent a luma mapping with chroma scaling decoding process from being applied to only the picture while permitting the luma mapping with chroma scaling decoding process to be applied to one or more other pictures of the plurality of pictures.

11. The computer program product of claim 10, wherein the luma mapping with chroma scaling decoding process comprises all decoding processes associated with luma mapping with chroma scaling.

12. The computer program product of claim 10, wherein the luma mapping with chroma scaling decoding process comprises only chroma residual scaling decoding processes associated with luma mapping with chroma scaling.

13. The computer program product of claim 10, further configured, upon execution, to:
   in an instance in which the picture is the gradual decoding refresh picture:
   determine whether a virtual boundary is within a current coding tree unit of the gradual decoding refresh picture, wherein the virtual boundary defines a separation of a clean area and a dirty area of the gradual decoding refresh picture; and
   in an instance in which the virtual boundary is within the current coding tree unit:

prevent a chroma residual scaling decoding process associated with luma mapping with chroma scaling from being applied to one or more coding units within the clean area.

14. The computer program product of claim 10, wherein the gradual decoding refresh picture comprises a current coding unit, and wherein the computer program product is further configured, upon execution, to:
   access the current coding unit of a gradual decoding refresh picture to be decoded, wherein the current coding unit is within a clean area;
   determine whether one or more pixels within a neighboring pixel area are within a dirty area; and
   in an instance in which one or more pixels within the neighboring pixel area are determined to be within the dirty area:
   prevent all pixels within the neighboring pixel area from being used for a chroma residual scaling process associated with luma mapping with chroma scaling.

15. The computer program product of claim 10, wherein the gradual decoding refresh picture comprises a current coding unit, and wherein the computer program product is further configured, upon execution, to:
   access the current coding unit of a gradual decoding refresh picture to be decoded, wherein the current coding unit is within a clean area;
   determine whether one or more pixels within a neighboring pixel area are within a dirty area; and
   in an instance in which one or more pixels within the neighboring pixel area are determined to be within the dirty area:
   pad the neighboring pixel area from one or more reconstructed pixels in the clean area for a chroma residual scaling decoding process associated with luma mapping with chroma scaling.

16. A method comprising:
   accessing a picture to be decoded, wherein the picture is part of a plurality of pictures of a coded video sequence;
   determining whether the picture is a gradual decoding refresh picture; and
   in an instance in which the picture is the gradual decoding refresh picture and on a per picture basis:
   preventing a luma mapping with chroma scaling decoding process from being applied to only the picture while permitting the luma mapping with chroma scaling decoding process to be applied to one or more other pictures of the plurality of pictures.

17. The method of claim 16, wherein the luma mapping with chroma scaling decoding process comprises all decoding processes associated with luma mapping with chroma scaling.

18. The method of claim 16, wherein the luma mapping with chroma scaling decoding process comprises only chroma residual scaling decoding processes associated with luma mapping with chroma scaling.

19. The method of claim 16, further comprising:
   in an instance in which the picture is the gradual decoding refresh picture:
   determining whether a virtual boundary is within a current coding tree unit of the gradual decoding refresh picture, wherein the virtual boundary defines a separation of a clean area and a dirty area of the gradual decoding refresh picture; and
   in an instance in which the virtual boundary is within the current coding tree unit:
   preventing a chroma residual scaling decoding process associated with luma mapping with chroma scaling from being applied to one or more coding units within the clean area.

20. The method of claim 16, wherein the gradual decoding refresh picture comprises a current coding unit, and the method further comprises:
   accessing the current coding unit of a gradual decoding refresh picture to be decoded, wherein the current coding unit is within a clean area;
   determining whether one or more pixels within a neighboring pixel area are within a dirty area; and
   in an instance in which one or more pixels within the neighboring pixel area are determined to be within the dirty area:
   preventing all pixels within the neighboring pixel area from being used for a chroma residual scaling process associated with luma mapping with chroma scaling.

* * * * *